(12) United States Patent
Bai et al.

(10) Patent No.: US 10,728,526 B2
(45) Date of Patent: Jul. 28, 2020

(54) COMMUNICATION METHODS AND SYSTEMS, ELECTRONIC DEVICES, AND READABLE STORAGE MEDIA

(71) Applicant: GUANGDONG OPPO MOBILE TELECOMMUNICATIONS CORP., LTD., Dongguan, Guangdong (CN)

(72) Inventors: Jian Bai, Guangdong (CN); Hai Tang, Guangdong (CN); Xueyong Zhang, Guangdong (CN); Xiangnan Lyu, Guangdong (CN); Yang Xia, Guangdong (CN); Hu Li, Guangdong (CN); Ting Chen, Guangdong (CN); Guohui Tan, Guangdong (CN); Zhengpeng Tan, Guangdong (CN); Biao Chen, Guangdong (CN); Fenghua Xu, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/403,570

(22) Filed: May 5, 2019

(65) Prior Publication Data
US 2019/0342542 A1 Nov. 7, 2019

(30) Foreign Application Priority Data
May 6, 2018 (CN) .......................... 2018 1 0423517

(51) Int. Cl.
*H04N 13/271* (2018.01)
*H04N 13/167* (2018.01)
(Continued)

(52) U.S. Cl.
CPC .......... *H04N 13/271* (2018.05); *H04N 7/147* (2013.01); *H04N 13/161* (2018.05);
(Continued)

(58) Field of Classification Search
CPC .... H04N 13/271; H04N 7/147; H04N 13/167; H04N 13/254; H04N 13/161;
(Continued)

(56) References Cited

U.S. PATENT DOCUMENTS

| 2005/0207486 A1* | 9/2005 | Lee | .......................... H04N 7/142 375/240.01 |
| 2012/0038626 A1 | 2/2012 | Kim | |

(Continued)

FOREIGN PATENT DOCUMENTS

| CN | 201813477 | 4/2011 |
| CN | 102868901 | 1/2013 |

(Continued)

OTHER PUBLICATIONS

SIPO, First Office Action for CN Application No. 201810423517.X, dated May 15, 2019.
(Continued)

*Primary Examiner* — Stella L. Woo
(74) *Attorney, Agent, or Firm* — Hodgson Russ LLP (57) ABSTRACT

The present disclosure provides a communication method, a communication system, an electronic device, and a non-transitory computer-readable storage medium. The method includes: obtaining a plurality of 2D images and/or a plurality of depth maps for a current scene; processing the plurality of 2D images and/or the plurality of depth maps to obtain a plurality of 3D images; and transmitting the plurality of 3D images to the terminal device.

17 Claims, 7 Drawing Sheets

(51) Int. Cl.
*H04N 13/254* (2018.01)
*H04N 13/161* (2018.01)
*H04N 7/14* (2006.01)
*H04W 56/00* (2009.01)

(52) U.S. Cl.
CPC ......... *H04N 13/167* (2018.05); *H04N 13/254* (2018.05); *H04W 56/001* (2013.01)

(58) Field of Classification Search
CPC ........... H04N 2007/145; H04N 13/194; H04N 7/141; H04W 56/001
See application file for complete search history.

(56) References Cited

U.S. PATENT DOCUMENTS

| | | | |
|---|---|---|---|
| 2013/0016176 | A1 | 1/2013 | Hines et al. |
| 2014/0028799 | A1* | 1/2014 | Kuffner .................. G01B 11/24 348/46 |
| 2015/0365628 | A1* | 12/2015 | Ben-Bassat ............. G06F 3/011 348/14.1 |
| 2015/0382038 | A1 | 12/2015 | Hefeeda et al. |
| 2017/0085733 | A1* | 3/2017 | Ilic .......................... G06T 19/20 |
| 2017/0178392 | A1* | 6/2017 | Zuccarino ............. G06T 15/205 |
| 2018/0130255 | A1* | 5/2018 | Hazeghi ............... H04N 13/243 |

FOREIGN PATENT DOCUMENTS

| | | |
|---|---|---|
| CN | 102164265 | 3/2013 |
| CN | 104008153 | 8/2014 |
| CN | 105872444 | 8/2016 |
| CN | 206181270 | 5/2017 |
| CN | 107948499 | 4/2018 |
| CN | 207218938 | 4/2018 |
| CN | 108632597 | 10/2018 |
| EP | 2451176 | 5/2012 |

OTHER PUBLICATIONS

WIPO, English translation of the ISR and WO for PCT/CN2019/085140, dated Jul. 26, 2019.

EPO, Office Action for EP Application No. 19172197.6, dated Oct. 8, 2019.

SIPO, Notice of Registration for CN Application No. 201810423517.X, dated Nov. 11, 2019.

\* cited by examiner

COMMUNICATION METHODS AND SYSTEMS, ELECTRONIC DEVICES, AND READABLE STORAGE MEDIA

CROSS REFERENCE TO RELATED APPLICATION

This application claims priority to Chinese Patent Application No. 201810423517.X, filed May 6, 2018, the entire disclosure of which is incorporated herein by reference for all purposes.

TECHNICAL FIELD

The present disclosure relates to the field of communications technologies, and more particularly, to a communication method, a communication system, an electronic device, and a non-transitory computer-readable storage medium.

BACKGROUND

At present, 2D (2-dimensional or two-dimensional) video is widely used in people's lives and work, for example, 2D video playing, 2D video calling, 2D video conferencing. However, although 2D video may give people enough imagery, it does not contain depth information and cannot achieve stereoscopic rendering because images that make up 2D video are 2D.

SUMMARY

The communication method provided in a first aspect of the embodiments of the present disclosure includes:
 obtaining, by an electronic device, a plurality of 2D images and/or a plurality of depth maps for a current scene, the plurality of 2D images and/or the plurality of depth maps being aligned in time;
 processing, by the electronic device, the plurality of 2D images and/or the plurality of depth maps to obtain a plurality of first three-dimensional (3D) images; and
 transmitting, by the electronic device the plurality of first 3D images to the terminal device by means of wireless communication.

The electronic device provided in a second aspect of the embodiments of the present disclosure includes an image acquisition component, configured to obtain a plurality of 2D images and/or a plurality of depth maps for a current scene, the plurality of 2D images and/or the plurality of depth maps being aligned in time; a processor, configured to process the plurality of 2D images and/or the plurality of depth maps to obtain a plurality of first 3D images; and a communication module, configured to transmit the plurality of first 3D images to the terminal device.

The non-transitory computer-readable storage medium provided in a third aspect of the embodiments of the present disclosure includes one or more computer executable instructions. When the one or more computer executable instructions are executed by one or more processors, the one or more processors are caused to perform any communication method described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 1:
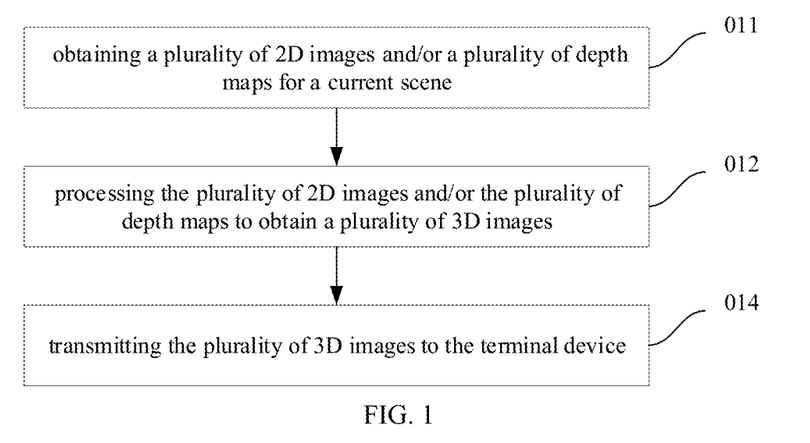
FIG. 1 illustrates a flow chart of a communication method according to some embodiments of the present disclosure.
Figure 2:
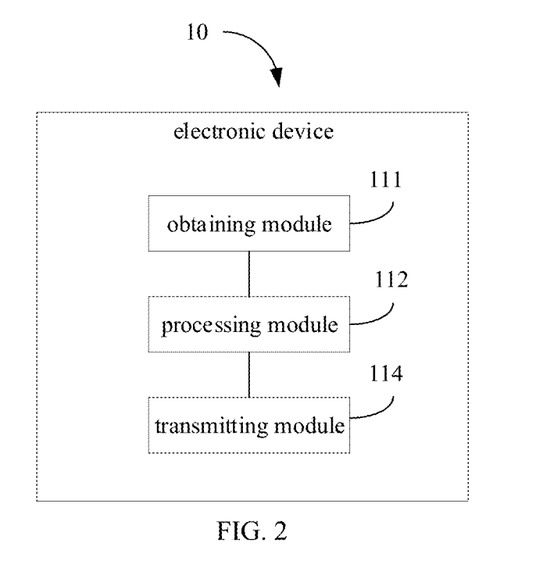
FIG. 2 illustrates a block diagram of an electronic device according to some embodiments of the present disclosure.
Figure 11:
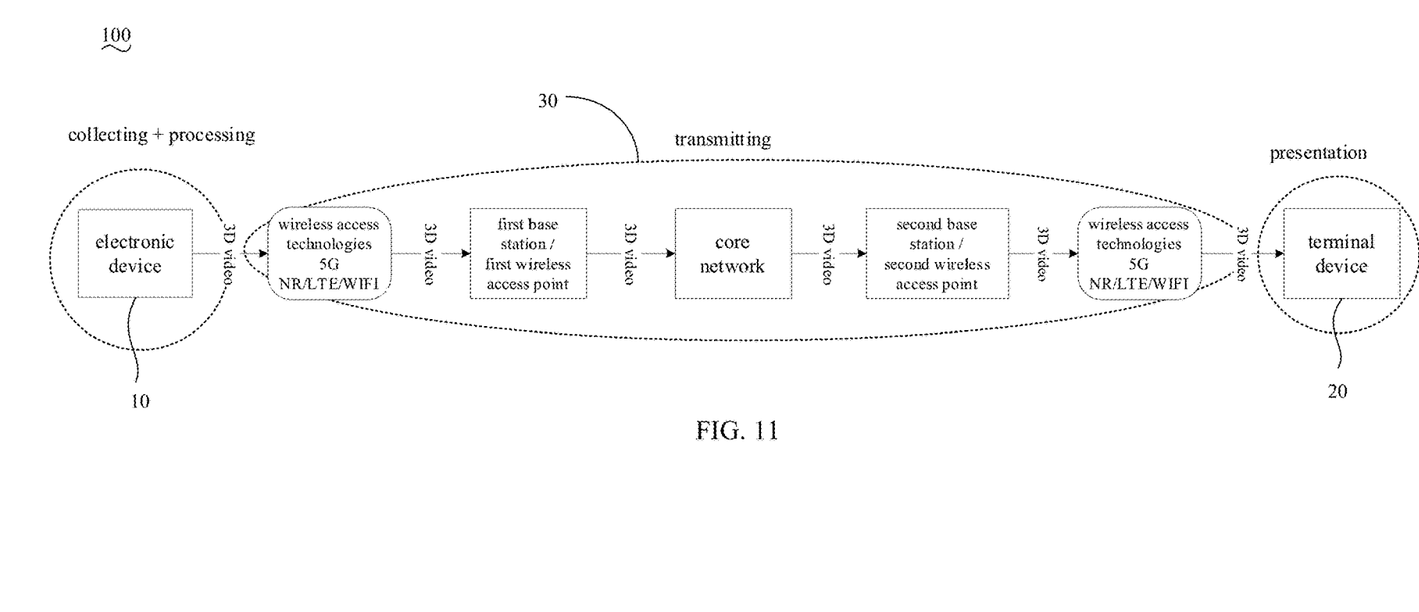
FIG. 11 illustrates a schematic diagram of a communication system according to some embodiments of the present disclosure.

Referring to FIG. 1, FIG. 2, and FIG. 11, the present disclosure provides a communication method for an electronic device 10. The electronic device 10 communicates with a terminal device 20 by means of wireless communication. The method includes acts in the following blocks.

011: a plurality of 2D images and/or a plurality of depth maps for a current scene, are obtained. The plurality of 2D images and/or the plurality of depth maps are aligned in time.

012: the plurality of 2D images and/or the plurality of depth maps are processed to obtain a plurality of 3D images.

In detail, the server 30 may generate the plurality of 3D images by the existing 3D technologies, such as data representing as (RGB (i.e., 2D image), depth (i.e., the depth map), T (i.e., time)) may be displayed by software such as meshlab, or holographic projection technologies, which is omitted herein.

014: the plurality of 3D images is transmitted to the terminal device 20.

Referring to FIG. 2 and FIG. 11, the present disclosure further provides an electronic device 10. The electronic device 10 communicates with the terminal device 20 by means of wireless communication. The electronic device 10 includes an obtaining module 111, a processing module 112 and a transmitting module 114. The act in block 011 may be implemented by the obtaining module 111. The act in block 012 may be implemented by the processing module 112. The act in block 014 may be implemented by the transmitting module 114. That is, the obtaining module 111 may be configured to obtain the plurality of 2D images and/or the plurality of depth maps for the current scene. The processing module 112 may be configured to process the plurality of 2D images and/or the plurality of depth maps to obtain the plurality of 3D images. The transmitting module 114 may be configured to transmit the plurality of 3D images to the terminal device 20.

Figure 3:
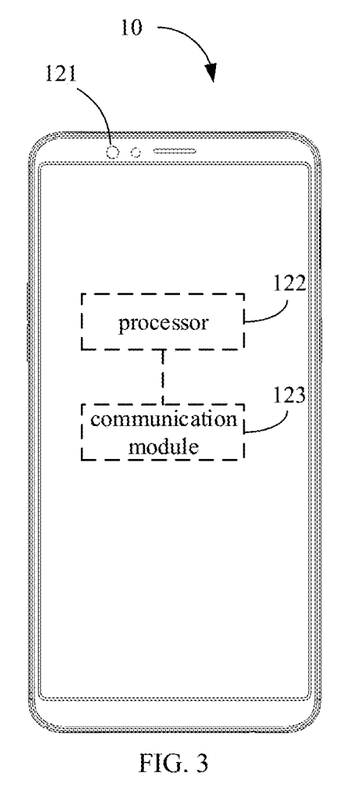
FIG. 3 illustrates a schematic diagram of an electronic device according to some embodiments of the present disclosure.

Referring to FIG. 3 and FIG. 11, the present disclosure further provides an electronic device 10. The electronic device 10 communicates with the terminal device 20 by means of wireless communication. The electronic device 10 includes an image acquisition component 121, a processor 122 and a communication module 123. The act in block 011 may be implemented by the image acquisition component 121. The act in block 012 may be implemented by the processor 122. The act in block 014 may be implemented by the communication module 123. That is, the image acquisition component 121 may be configured to obtain the plurality of 2D images and/or the plurality of depth maps for the current scene. The processor 122 may be configured to process the plurality of 2D images and/or the plurality of depth maps to obtain the plurality of 3D images. The communication module 123 may be configured to transmit the plurality of 3D images to the terminal device 20.

The electronic device 10 may be a mobile phone, a tablet computer, a notebook computer, a smart wearable device (a smart helmet, smart glasses, a smart bracelet, a smart watch, etc.), and the like. The terminal device 20 may also be a mobile phone, a tablet computer, a notebook computer, a smart wearable device (a smart helmet, smart glasses, a smart bracelet, a smart watch, etc.), and the like, and also be other display device, such as a virtual-reality head-mounted display device, an augmented-reality display device, a holographic stereoscopic projection device, a television equipped with a 3D liquid crystal displayer.

The image acquisition component 121 may be front or rear.

In detail, the image acquisition component 121 may include a structured light projection module. The structured light projection module may include a structured light projector and an infrared camera. The structured light projector emits a laser pattern into a target space. The infrared camera captures a laser pattern modulated by the target object. The processor 122 calculates a depth map of the laser pattern by using an image matching algorithm. When the image acquisition component 121 includes the structured light projection module, the image acquisition component 121 also includes a visible light camera for acquiring a 2D image of the target space. The 2D image includes color information of each object in the target space. The processor 122 converts the plurality of 2D images and the plurality of depth maps having one-to-one corresponding to the plurality of 3D images. The plurality of 3D images may form a 3D video. In detail, the plurality of 3D images is displayed at a predetermined frame rate in the terminal device 20 to form the 3D video. The predetermined frame rate is greater than or equal to a frame rate that can be resolved by the human eye (i.e. 24 3D images per second may be displayed). The predetermined frame rate may be 24 frames (images)/second, 30 frames (images)/second, 60 frames (images)/second, 120 frames (images)/second, and the like.

Alternatively, the image acquisition component 121 may include two cameras. The two cameras may both be visible light cameras, or the two cameras may be an infrared camera and a visible light camera. The two cameras have a fixed relative distance. Thus, a plurality of first 2D images and a plurality of second 2D images may be obtained by the binocular stereoscopic acquisition method. When the two cameras may both be the visible light cameras, the first 2D image and the second 2D image are 2D color images. When the two cameras are the infrared camera and the visible light camera, the first 2D image is a 2D infrared image, and the second 2D image is a 2D color image. The processor 322 may obtain the plurality of 3D color images based on the plurality of first 2D images and the plurality of second 2D images having the one-to-one. The plurality of 3D images may form a 3D video.

Alternatively, the image acquisition component 121 may include a TOF (Time of Flight) sensor module. The TOF sensor module includes a laser projector and an infrared camera. The laser projector emits uniform light into a target space. The infrared camera receives the reflected light and records the time point of emitting the light and the time point of receiving the light. The processor 122, based on a time difference between the time point of emitting the light and the time point of receiving the light, and the speed of light, calculates a depth pixel value corresponding to the object in the target space and combines the plurality of depth pixel values to obtain a depth map. When the image acquisition component 121 includes the TOF sensor module, the image acquisition component 121 also includes a visible light camera for capturing a 2D image of the target space. The 2D image includes color information of each object in the target space. The processor 122 converts the plurality of 2D images and the plurality of depth maps having one-to-one corresponding to the plurality of 3D images. The plurality of 3D images may form a 3D video.

It may be understood that current video calls are limited to the 2D video transmission. The plurality of images that make up the 2D video are 2D, which do not contain depth information, and cannot render 3D stereoscopic effects.

With the communication method and the electronic device 10, provided in the embodiments of the present disclosure, the plurality of 2D images and the plurality of depth maps are collected by the electronic device 10, the plurality of 2D images and/or the plurality of depth maps are processed by the electronic device 10 to obtain the plurality of 3D images, and the plurality of 3D images is transmitted by the electronic device 10 to the terminal device 20 by means of wireless communication. In this way, the 3D video transmission may be realized, such that a user may view stereoscopic 3D video effect at the terminal device 20, and have a better experience.

Figure 4:
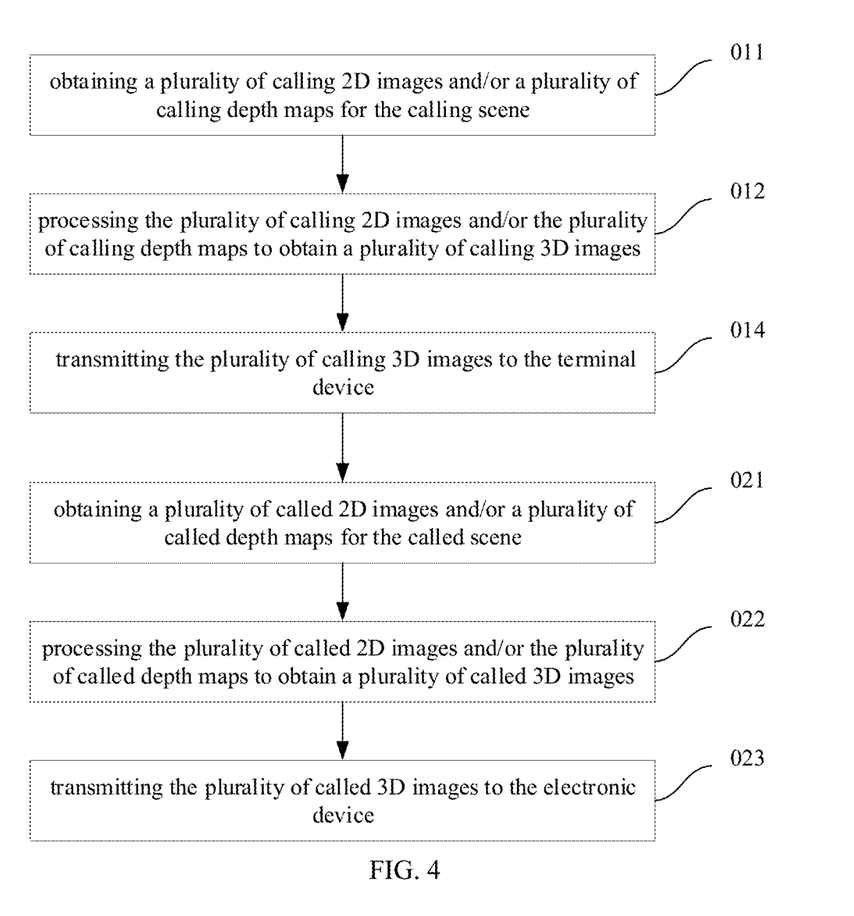
FIG. 4 illustrates a flow chart of a communication method according to some embodiments of the present disclosure.

Referring to FIG., in some embodiments, the communication method provided in the embodiments of the present disclosure may be applied to a 3D video call and a 3D video conference, which may realize the interaction among the users. It is assumed that the electronic device 10 is a calling device, and the terminal device 20 is a called device. In this case, the act in block 011 may be follows: a plurality of calling 2D images and/or a plurality of calling depth maps are obtained for the calling scene; the act in block 012 may be follows: the plurality of calling 2D images and/or the plurality of calling depth maps are processed to obtain a plurality of calling 3D images; the act in block 014 may be follows: the plurality of calling 3D images is transmitted to the terminal device 20. Further, the communication method provided in the embodiments of the present disclosure further includes acts in the following blocks.

021: a plurality of called 2D images and/or a plurality of called depth maps for the called scene, are obtained.

022: the plurality of called 2D images and/or the plurality of called depth maps are processed to obtain a plurality of called 3D images.

023: the plurality of called 3D images is transmitted to the electronic device 10.

Figure 5:
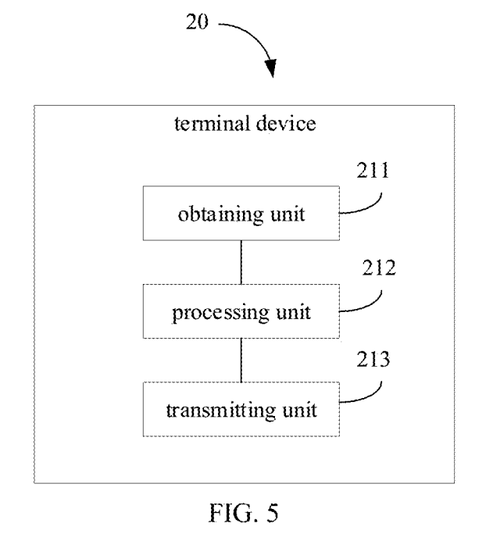
FIG. 5 illustrates a block diagram of a terminal device according to some embodiments of the present disclosure.

Referring to FIG. 5, in some embodiments, the terminal device 20 includes an obtaining unit 211, a processing unit 212 and a transmitting unit 213. The act in block 021 may be implemented by the obtaining unit 211. The act in block 022 may be implemented by the processing unit 212. The act in block 023 may be implemented by the transmitting unit 213. That is, the obtaining unit 211 is configured to obtain the plurality of called 2D images and/or the plurality of called depth maps for the called scene. The processing unit 212 is configured to process the plurality of called 2D images and/or the plurality of called depth maps to obtain the plurality of called 3D images. The transmitting unit 212 is configured to transmit the plurality of called 3D images to the terminal device 20.

Figure 6:
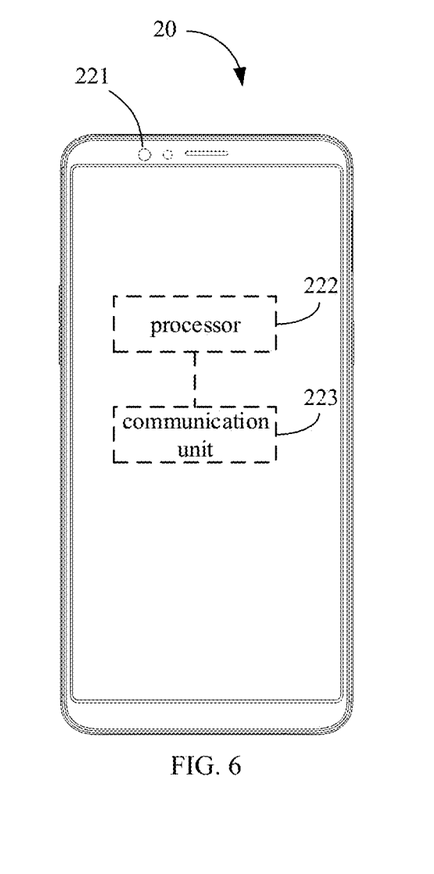
FIG. 6 illustrates a schematic diagram of a terminal device according to some embodiments of the present disclosure.

Referring to FIG. 6, in some embodiments, the terminal device 20 includes an image acquisition component 221, a processor 222 and a communication unit 223. The act in block 021 may be implemented by the image acquisition component 221. The act in block 022 may be implemented by the processor 222. The act in block 023 may be implemented by the communication unit 223. That is, the image acquisition component 221 is configured to obtain the plurality of called 2D images and/or the plurality of called depth maps for the called scene. The processor 222 is configured to process the plurality of called 2D images and/or the plurality of called depth maps to obtain the plurality of called 3D images. The communication unit 223 is configured to transmit the plurality of called 3D images to the electronic device 10.

In detail, the electronic device 10 is referred to as the reference device, such that the electronic device 10 is the calling device, and the use object of the electronic device 10 is the calling object; the terminal device 20 is the called device, and the use object of the terminal device 20 is the called object. The image acquisition component 121 of the electronic device 10 is responsible for collecting the plurality of calling 2D images and/or the plurality of calling depth maps of the target space in which the calling object is located, and the plurality of calling 2D images and/or the plurality of calling depth maps are processed by the processor 122 to obtain a plurality of calling 3D images. The communication module 123 of the electronic device 10 transmits the plurality of calling 3D images to the terminal device 20 by means of wireless communication. After receiving by the terminal device 20, the terminal device 20 plays the 3D video of the calling object. Similarly, at the end of the called device, the image acquisition component 221 of the terminal device 20 is responsible for collecting the plurality of called 2D images and/or the plurality of called depth maps of the target space in which the called object is located, and the plurality of called 2D images and/or the plurality of called depth maps are processed by the processor 222 to obtain a plurality of called 3D images. The communication unit 223 of the terminal device 20 transmits the plurality of called 3D images to the electronic device 10 by means of wireless communication. After receiving the plurality of called 3D images, the electronic device 10 may play the 3D video of the called object.

In this way, both the electronic device 10 and the terminal device 20 may transmit the 3D videos, thereby realizing 3D video interaction between the electronic device 10 and the terminal device 20, such as a 3D video call and a 3D video conference.

Figure 7:
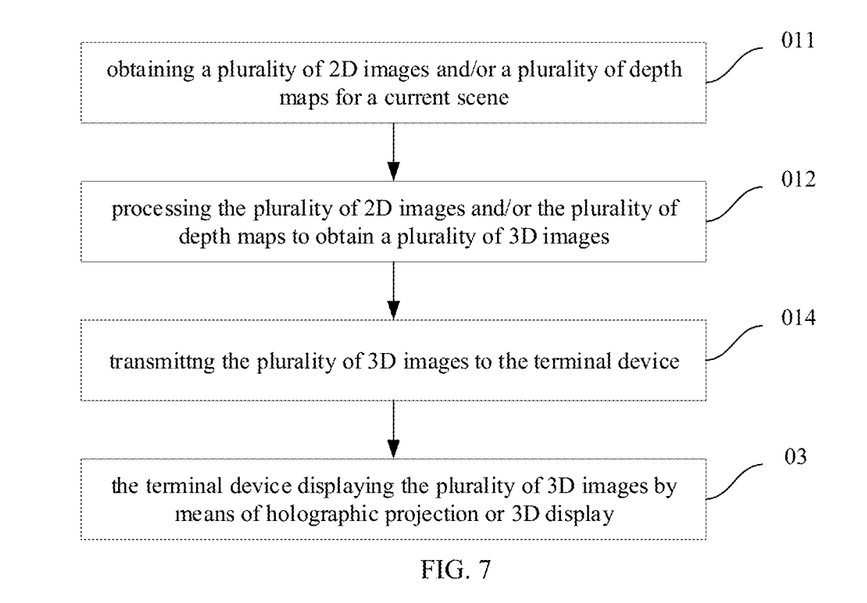
FIG. 7 illustrates a flow chart of a communication method according to some embodiments of the present disclosure.

Referring to FIG. 7, in some embodiments, the communication method provided in the embodiments of the present disclosure may also be applied to a virtual-reality head-mounted display device, an augmented-reality display device, a holographic stereoscopic projection device, a display device equipped with a 3D liquid crystal displayer, or the like. At this time, the communication method provided in the embodiments of the present disclosure further includes acts in the following blocks.

03: the terminal device 20 displays the plurality of 3D images by means of holographic projection or 3D display.

Figure 8:
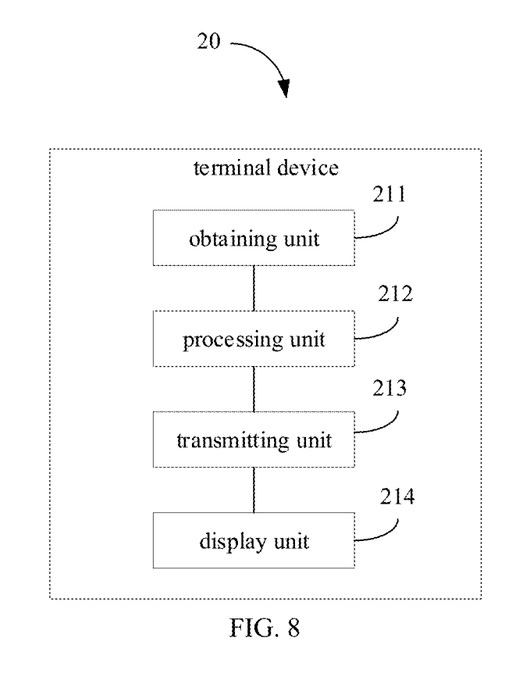
FIG. 8 illustrates a block diagram of a terminal device according to some embodiments of the present disclosure.

Referring to FIG. 8, in some embodiments, the terminal device 20 includes a display unit 214. The act in block 03 may be implemented by the display unit 214. That is, the display unit 214 may be a light machine (an optical engine) by using holographic projection or a display screen for displaying the plurality of 3D images by means of 3D display.

Referring to FIG. 6, in some embodiments, the act in block 03 may be implemented by the processor 222. That is, the processor 222 may be configured to control the terminal device 20 to display the plurality of 3D images by means of holographic projection or 3D display.

In detail, the image acquisition component 121 of the electronic device 10 is responsible for collecting the plurality of 2D images and/or the plurality of depth maps for the target space in which the use object of the electronic device 10 is located. The processor 122 converts the plurality of 2D images and/or the plurality of depth maps to the plurality of 3D images. The communication module 123 of the electronic device 10 transmits the plurality of 3D images to the terminal device 20 by means of wireless communication. The terminal device 20 displays the plurality of 3D images to present a 3D display effect.

As such, when the electronic device 10 is not equipped with the display device, the plurality of 3D images may be transmitted to the device capable of displaying the plurality of 3D images by means of wireless communication, such that the user may view the stereoscopic rendering effect of the 3D video, which is beneficial to improve the user experience.

Figure 9:
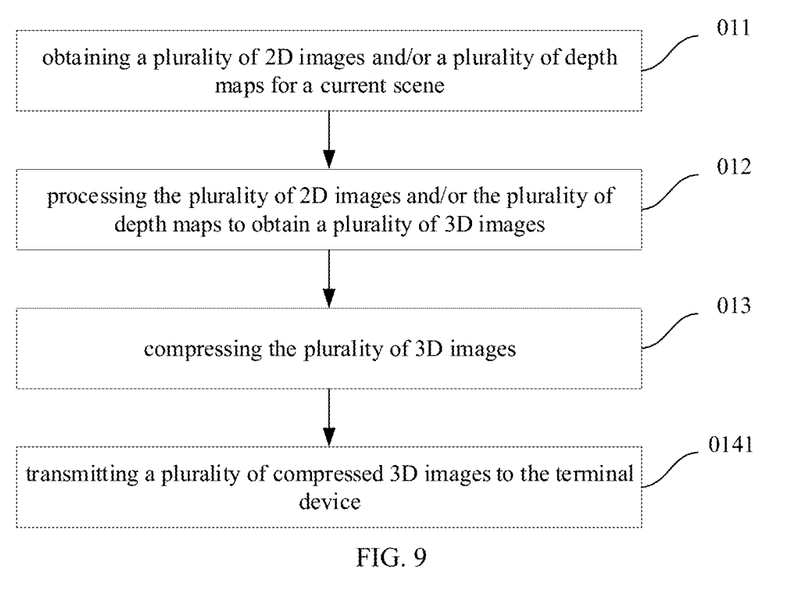
FIG. 9 illustrates a flow chart of a communication method according to some embodiments of the present disclosure.

Referring to FIG. 9, in some embodiments, the communication method provided in the embodiments of the present disclosure further includes an act in the following blocks.

013: the plurality of 3D images is compressed.

The act in block 014, i.e., the plurality of 3D images is transmitted to the terminal device 20, may include an act in the following blocks.

0141: a plurality of compressed 3D images is transmitted to the terminal device 20.

Figure 10:
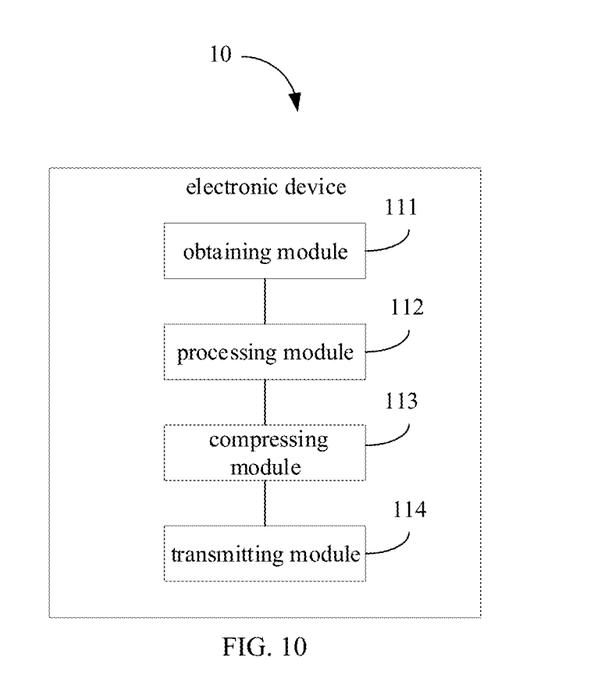
FIG. 10 illustrates a block diagram of an electronic device according to some embodiments of the present disclosure.

Referring to FIG. 10, in some embodiments, the electronic device 10 further includes a compressing module 113. The act in block 013 may be implemented by the compressing module 113. The act in block 0141 may be implemented by the transmitting module 114. That is, the compressing module 113 may be configured to compress the plurality of 3D images. The transmitting module 114 may be configured to transmit the plurality of compressed 3D images to the terminal device 20.

Referring to FIG. 3, in some embodiments, the act in block 013 may be implemented by the processor 122. The act in block 0141 may be implemented by the communication module 123. That is, the processor 122 may be configured to compress the plurality of 3D images. The communication module 123 may be configured to transmit the plurality of compressed 3D images to the terminal device 20.

It should be understood that the data amount of the 3D images is large, and it requires the wireless communication method to have a higher transmission bandwidth when the data is transmitted (especially for a scenario with higher requirements on low latency, such as a 3D video call). Due to the development of wireless communication technologies, current various wireless communication methods have not been able to achieve lossless transmission of the 3D image with the larger size. Therefore, it is necessary to compress the plurality of 3D images forming the 3D video, and reduce the data amount of the 3D video, thereby realizing a higher-rate transmission on the 3D images, and satisfying the requirements of low latency in certain scenarios.

In addition, in some embodiments, after receiving the compressed 3D video from the electronic device 10, the terminal device 20 needs to decompress the 3D video before displaying. Similarly, after receiving the compressed 3D video from the terminal device 20, the electronic device 10 also needs to decompress the 3D video before displaying.

Further, a compression ratio may be adaptively adjusted according to different scenarios. In an actual application, the electronic device 10 determines the scenario where the electronic device 10 locates firstly, and then adjusts the corresponding compression ratio according to the determined scenario. For example, when the 3D video for a scenario of video call, the accuracy of each 3D image is not high. Therefore, the compression ratio may be appropriately increased correspondingly, such that the 3D video interaction may be realized on one hand, and the low delay requirement may also be satisfied on the other hand. When the 3D video is transmitted for holographic projection, the accuracy of each 3D image is high, and accordingly, the compression ratio may be appropriately decreased, thereby satisfying the high precision requirements of holographic projection.

Similarly, for the terminal device 20, when the terminal device 20 transmits the plurality of called 3D images, the plurality of called 3D images also may be compressed. The plurality of compressed called 3D images may be transmitted to the electronic device 10 by means of wired communication. The compression ratio may also be adaptively adjusted according to different scenarios.

Referring to FIG. 11, in some embodiments, the electronic device 10 transmits the plurality of 3D images to the terminal device 10 by means of sub-6G frequency band of 5G (the fifth-generation mobile communication). At this time, a transmission route of the plurality of 3D images may be as follows. The electronic device 10 firstly transmits the plurality of 3D images to a first base station by means of sub-6G frequency band of 5G. The first base station transmits the plurality of 3D images to a core network by means of wired communication. The core network transmits the plurality of 3D images to a second base station by means of wired communication. The second base station transmits the plurality of 3D images to the terminal device 20 by means of wireless communication.

The sub-6G frequency band of 5G includes a plurality of working frequency bands. For example, when the working frequency band is n78, the corresponding frequency range is 3.3 GHz to 3.8 GHz; when the working frequency band is n79, the corresponding frequency range is 4.4 GHz~5.0 GHz; when the working frequency band is n77, the corresponding frequency range is 3.3 GHz~4.2 GHz; when the working frequency band is n41, the corresponding frequency range is 2.496 GHz~2.690 GHz; when the working frequency band is n8, the corresponding uplink frequency range is 880 MHz~915 MHz, and the corresponding downlink frequency range is 915 MHz~960 MHz; when the working frequency band is n3, the corresponding uplink frequency range is 1710 MHz~1785 MHz, and the corresponding downlink frequency range is 180 5MHz~1880 MHz; when the working frequency band is n80, the corresponding frequency range is 1710 MHz~1785 MHz; and when the working frequency band is n81, the corresponding frequency range is 880 MHz~915 MHz. The sub-6 frequency band of 5G may improve the spectral efficiency of traditional frequency bands, and the data-rate expansion capacity is higher and the coverage is larger in the comparable frequency range. The wireless infrastructure of sub-6 frequency band will be widely deployed with a beamforming solution that will greatly extend network coverage and building penetration. In this way, by employing the sub-6G frequency band of 5G to transmit the plurality of 3D images may meet the transmission rate requirements on one hand, and the user environment is less restrictive on the other hand, such that efficient transmission of the plurality of 3D images may be realized in most scenarios.

For example, the electronic device 10 collects the plurality of 2D images and the plurality of depth maps. The resolution of each 2D color image is 1280×720, and the color resolution of each pixel is 12 bits. The resolution of each depth map is 1280×720, and the grayscale resolution of each pixel is 16 bits. The frame rate of the 3D video is 60 frames. The compression ratio is 102:1. The size of the header file corresponding to each 3D image is 108 bits. Therefore, a size of the data stream transmitted by the electronic device 10 is: [(1280*720*12+1280*720*16+108)*60]/(102/1)=14.48 Mbps. At present, the 5G sub-6G wireless transmission mode has an uplink rate of at least 230 Mbps and a downlink rate of at least 1300 Mbps. It may be seen that the 5G sub-6G wireless transmission mode may fully meet the high-efficiency transmission of the high-definition 3D video of 720P.

For another example, the electronic device 10 collects the plurality of 2D images and the plurality of depth maps. The resolution of each 2D color image is 1920×1080, and the color resolution of each pixel is 12 bits. The resolution of each depth map is 1920×1080, and the grayscale resolution of each pixel is 16 bits. The frame rate of the 3D video is 60 frames. The compression ratio is 102:1. The size of the header file corresponding to each 3D image is 108 bits. Therefore, a size of the data stream transmitted by the electronic device 10 is: [(1920*1080*12+1920*1080*16+108)*60]/(102/1)=32.57 Mbps. At present, the 5G sub-6G wireless transmission mode has an uplink rate of at least 230 Mbps and a downlink rate of at least 1300 Mbps. It may be seen that the 5G sub-6G wireless transmission mode may fully meet the high-efficiency transmission of the high-definition 3D video of 1080P.

Referring to FIG. 11, in some embodiments, the electronic device 10 transmits the plurality of 3D images by means of millimeter wave to the terminal device 20. At this time, a transmission route of the plurality of 3D images may be as follows. The electronic device 10 firstly transmits the plurality of 3D images to a first base station by means of millimeter wave. The first base station transmits the plurality of 3D images to a core network by means of wired communication. The core network transmits the plurality of 3D images to a second base station by means of wired communication. The second base station transmits the plurality of 3D images to the terminal device 30 by means of wireless communication.

The frequency band corresponding to the millimeter wave is 24.25 GHz to 52.6 GHz in 5G and 60 GHz of 802.11ad or 802.11ay in WIFI (Wireless Fidelity). The millimeter wave has a very large transmission bandwidth, which may greatly increase the wireless transmission rate. At present, based on Time Division Duplexing (TDD) standard 5G millimeter wave transmission mode, the peak of the uplink rate may reach 2000 Mbps, and the peak of the downlink rate may reach 2000 Mbps. Both the uplink rate and the downlink rate are measured when the uplink transmission exists only or when the downlink transmission exists only. Since the uplink data and the downlink data in time division duplexing is transmitted in time-division intervals, considering the actual use, if the ratio of uplink and downlink is 50%, the uplink rate may also reach 1000 Mbps, and the downlink rate may also reach 1000 Mbps. It may be seen that the 5G millimeter wave wireless communication method may also efficiently transmit the 3D video.

Referring to FIG. 11, in some embodiments, the electronic device 10 transmits the plurality of 3D images by means of FDD-LTE (Frequency Division Duplexing-Long Term Evolution). At this time, a transmission route of the plurality of 3D images may be as follows. The electronic device 10 firstly transmits the plurality of 3D images to a first base station by means of FDD-LTE. The first base station transmits the plurality of 3D images to a core network by means of wired communication. The core network transmits the plurality of 3D images to a second base station by means of wired communication. The second base station transmits the plurality of 3D images to the terminal device 30 by means of wireless communication.

FDD-LTE refers to Frequency Division Duplexing (FDD) standard in the fourth-generation mobile communication network (Long Term Evolution, LTE). In this standard, the uplink data and the downlink data are simultaneously transmitted in different frequency bands. Therefore, FDD-LTE wireless transmission mode has a strong data transmission capability. The FDD-LTE wireless transmission mode is more suitable for symmetric services. When supporting symmetric services, it may make full use of the uplink and downlink spectrum. For example, when FDD-LTE is used to transmit the plurality of 3D images during the 3D video call, the uplink data and the downlink data are simultaneously transmitted in the uplink channel and the downlink channel because the ratio of the uplink channel and the downlink channel of the FDD-LTE is 1:1. Therefore, it may simultaneously upload and download the 3D images with large data size in 3D video call. At present, based on the wireless communication method of frequency division duplex in the fourth-generation mobile communication network, the uplink rate is about 200 Mbps, and the downlink rate is about 1200 Mbps. Referring to the above-mentioned example of 32.57 Mbps of ultra-clear 3D video of 1080P, and of 14.48 Mbps of HD (high-definition) 3D video of 720P, it may be seen that the FDD-LTE may fully meet the high-efficiency transmission of the 3D video.

Referring to FIG. 11, in some embodiments, the electronic device 10 transmits the plurality of 3D images by means of TDD-LTE (Time Division-Long Term Evolution). At this time, a transmission route of the plurality of 3D images may be as follows. The electronic device 10 firstly transmits the plurality of 3D images to a first base station by means of TDD-LTE. The first base station transmits the plurality of 3D images to a core network by means of wired communication. The core network transmits the plurality of 3D images to a second base station by means of wired communication. The second base station transmits the plurality of 3D images to the terminal device 30 by means of wireless communication.

TDD-LTE refers to Time Division Duplexing (FDD) standard in the fourth-generation mobile communication network (Long Term Evolution, LTE). In this standard, the uplink data and the downlink data are transmitted on the same frequency band according to time cross allocation. The TDD-LTE wireless transmission mode has high flexibility, and the time slot ratio of uplink transmission and the time slot ratio of downlink transmission may be flexibly adjusted according to actual needs. The TDD-LTE wireless transmission mode is more suitable for asymmetric services. At present, based on the wireless communication method of time division duplex in the fourth-generation mobile communication network, the uplink rate is at least 24 Mbps, and the downlink rate is about 800 Mbps. Referring to the above-mentioned example of 14.48 Mbps of HD 3D video of 720P, the TDD-LTE wireless transmission mode may fully satisfy the efficient transmission of HD 3D video of 720P. Referring to the above-mentioned example of 32.57 Mbps of ultra-clear 3D video of 1080P, the uplink rate of the TDD-LTE wireless transmission mode may not meet the transmission rate requirement. However, due to the high flexibility of TDD-LTE, the time slot ratio of the uplink transmission and the time slot ratio of the downlink transmission may be flexibly adjusted. Therefore, in some scenarios, the TDD-LTE wireless transmission mode may also satisfy the transmission of ultra-clear 3D video of 1080P.

Referring to FIG. 11, in some embodiments, the electronic device 10 transmits the plurality of 3D images by means of WIFI. At this time, a transmission route of the plurality of 3D images may be as follows. The electronic device 10 firstly transmits the plurality of 3D images to a first wireless access point by means of WIFI. The first wireless access point transmits the plurality of 3D images to a core network by means of wired communication. The core network transmits the plurality of 3D images to a second wireless access point by means of wired communication. The second wireless access point transmits the plurality of 3D images to the terminal device 20 by means of wireless communication.

The application frequency bands of WIFI include 2G frequency band and 5G frequency band. The frequency range corresponding to the 2G frequency band is 2.402 GHz to 2.482 GHz, and the frequency range corresponding to the 5G frequency band is 5.150 GHz to 5.350 GHz, 5.470 GHz to 5.725 GHz, and 5.725 GHz to 5.850 GHz. The WIFI wireless communication mode adopts the time division duplex working mode. At present, in the 2G frequency band, the peak of the uplink rate of the WIFI wireless communication mode may reach 300 Mbps, and the peak of the downlink rate may reach 300 Mbps. Both the uplink rate and the downlink rate are measured when the uplink transmission exists only or when the downlink transmission exists only. Since the uplink data and downlink data in the time division duplex is transmitted in time-division intervals, considering the actual use, if the ratio of uplink and downlink is 50%, the uplink rate may also reach 150 Mbps, and the downlink rate may also reach 150 Mbps. In the 5G frequency band, the peak of the uplink rate of the WIFI wireless communication mode may reach 1732 Mbps, and the peak of the downlink rate may reach 1732 Mbps. Both the uplink rate and the downlink rate are measured when the uplink transmission exists only or when the downlink transmission exists only. Since the uplink data and downlink data in the time division duplex is transmitted in time-division intervals, considering the actual use, if the ratio of uplink and downlink is 50%, the uplink rate may also reach 866 Mbps, and the downlink rate may also reach 866 Mbps. It may be seen that the WIFI wireless communication method may also efficiently transmit the 3D video.

It should be noted that, in any of the foregoing embodiments, the second base station or the second wireless access point transmits the 3D images to the terminal device 20 or receives the 3D images from the terminal device 20 by means of wireless communication. The wireless communication may be any one of: WIFI, 4G (the fourth-generation mobile communication), and 5G.

Referring to FIG. 11, the present disclosure provides a communication system 100. The communication system 100 includes the electronic device 10 described above and the terminal device 20 described above. The electronic device 10 and the terminal device 20 communicate by means of wireless communication such as WIFI, 4G or 5G.

Further, the communication system 100 includes a transmission network 30. In detail, when the electronic device 10 transmits a plurality of 3D images by means of wireless communication such as 4G and 5G, the transmission network 30 includes a first base station, a core network, and a second base station. The electronic device 10 communicates with the first base station by sub-6G, millimeter wave, FDD-LTE or TDD-LTE, the first base station communicates with the core network by means of wired communication, the core network communicates with the second base station by means of wired communication, and the second base station communicates with the terminal device 20 by means of sub-6G, millimeter wave, FDD-LTE or TDD-LTE. When the electronic device 10 transmits a plurality of 3D images by means of WIFI, the transmission network 30 includes a first wireless access point, a core network, and a second wireless access point. The electronic device 10 communicates with the first wireless access point by means of WIFI, the first wireless access point communicates with the core network by means of wired communication, and the core network communicates with the second wireless access point by means of wired communication, and the second wireless access point communicates with the terminal device 20 by means of WIFI.

Referring to FIG. 3 and FIG. 6, the present disclosure further provides the non-transitory computer-readable storage medium including one or more computer executable instructions. When the one or more computer executable instructions are executed by one or more processors 122/222, the one or more processors 122/222, performs the communication method described in any of the above embodiments For example, when the one or more computer executable instructions are executed by the one or more processors 122, the one or more processors 122 may performs the following acts:

controlling the image acquisition component 121 to obtain a plurality of 2D images and/or a plurality of depth maps, for a current scene;

processing the plurality of 2D images and/or the plurality of depth maps to obtain a plurality of 3D images; and controlling the communication module 123 to transmit the plurality of 3D images to the terminal device 20.

For another example, when the one or more computer executable instructions are executed by the one or more processors 122, the one or more processors 122 may performs the following acts:

compressing the plurality of 3D images;

controlling the communication module 123 to transmit a plurality of compressed 3D images to the terminal device 20.

For another example, when the one or more computer executable instructions are executed by the one or more processors 222, the one or more processors 222 may performs the following acts:

controlling the image acquisition component 221 to obtain a plurality of called 2D images and/or a plurality of called depth maps for a called scene;

processing the plurality of called 2D images and/or the plurality of called depth maps to obtain a plurality of 3D called images; and controlling the communication component 223 to transmit the plurality of called 3D images to the electronic device 10.

For another example, when the one or more computer executable instructions are executed by the one or more processors 222, the one or more processors 222 may performs the following acts:

controlling the terminal device 20 to display the plurality of 3D images by means of holographic projection or 3D display.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be converted in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer-readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer-readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A communication method, comprising:
   obtaining, by an electronic device, a plurality of two-dimensional (2D) images and/or a plurality of depth maps for a current scene, the plurality of 2D images and/or the plurality of depth maps being aligned in time;
   processing, by the electronic device, the plurality of 2D images and/or the plurality of depth maps to obtain a plurality of first three-dimensional (3D) images;
   compressing the plurality of first 3D images in a compression ratio, wherein the compression ratio can be adaptively adjusted according to different scenarios, the scenarios including a location of the electronic device and an application of the plurality of 3D images; and
   transmitting, by the electronic device the plurality of compressed first 3D images to a terminal device by means of wireless communication.

2. The method of claim 1, wherein, the transmitting the plurality of first 3D images to the terminal device by means of wireless communication, comprises:
   transmitting the plurality of first 3D images to the terminal device by means of sub-6G frequency band of 5G, by means of millimeter wave, by means of Frequency Division Duplexing-Long Term Evolution (FDD-LTE), by means of Time Division Duplexing-Long Term Evolution (TDD-LTE), or by means of Wireless Fidelity (WIFI).

3. The method of claim 2, wherein the transmitting the plurality of first 3D images to the terminal device by means of sub-6G frequency band of 5G, by means of millimeter wave, by means of FDD-LTE, or by means of TDD-LTE, comprises:
   transmitting, by the electronic device, the plurality of first 3D images to a first base station by means of sub-6G frequency band of 5G, by means of millimeter wave, by means of FDD-LTE, or by means of TDD-LTE;
   transmitting, by the first base station, the plurality of first 3D images to a core network by means of wired communication;
   transmitting, by the core network, the plurality of first 3D images to a second base station by means of wired communication; and
   transmitting, by the second base station, the plurality of first 3D images to the terminal device by means of wireless communication.

4. The method of claim 2, wherein the transmitting the plurality of first 3D images to the terminal device by means of WIFI, comprises:
   transmitting, by the electronic device, the plurality of first 3D images to a first wireless access point by means of WIFI;
   transmitting, by the first wireless access point, the plurality of first 3D images to a core network by means of wired communication;
   transmitting, by the core network, the plurality of first 3D images to a second wireless access point by means of wired communication; and
   transmitting, by the second wireless access point, the plurality of first 3D images to the terminal device by means of wireless communication.

5. The method of claim 1, further comprising,
   capturing the plurality of depth maps is obtained by a structured light projection module provided in the electronic device; and/or
   capturing a plurality of first 2D images by a first camera provided in the electronic device, and capturing a plurality of second 2D images by a second camera provided in the electronic device, the plurality of first 2D images and the plurality of second 2D images having one-to-one corresponding, the plurality of 2D images comprises the plurality of first 2D images and the plurality of second 2D images; and/or
   capturing the plurality of depth maps by a TOF (Time of Flight) sensor module provided in the electronic device.

6. The method of claim 1, further comprising:
   receiving a plurality of second 3D images from the terminal device.

7. The method of claim 6, further comprising:
displaying the plurality of second 3D images at a predetermined frame rate to display a corresponding 3D video.

8. The method of claim 6, further comprising:
decompressing the plurality of second 3D images.

9. An electronic device, comprising:
- an image acquisition component, configured to obtain a plurality of two-dimensional (2D) images and/or a plurality of depth maps for a current scene, the plurality of 2D images and/or the plurality of depth maps being aligned in time;
- a processor, configured to process the plurality of 2D images and/or the plurality of depth maps to obtain a plurality of first 3D images and compress the plurality of first 3D images in a compression ratio, wherein the compression ratio can be adaptively adjusted according to different scenarios, the scenarios including a location of the electronic device and an application of the plurality of 3D images; and
- a communication module, configured to transmit the plurality of compressed first 3D images to a terminal device.

10. The electronic device of claim 9, wherein the communication module is configured to transmit the plurality of first 3D images to the terminal device by means of sub-6G frequency band of 5G, by means of millimeter wave, by means of Frequency Division Duplexing-Long Term Evolution (FDD-LTE), by means of Time Division Duplexing-Long Term Evolution (TDD-LTE), or by means of Wireless Fidelity (WIFI).

11. The electronic device of claim 10, wherein the communication module is configured to transmit the plurality of first 3D images to a first base station by means of sub-6G frequency band of 5G, by means of millimeter wave, by means of FDD-LTE, or by means of TDD-LTE,
- wherein, the first base station is configured to transmit the plurality of first 3D images to a core network by means of wired communication;
- the core network is configured to transmit the plurality of first 3D images to a second base station by means of wired communication; and
- the second base station is configured to transmit the plurality of first 3D images to the terminal device by means of wireless communication.

12. The electronic device of claim 10, wherein the communication module is configured to transmit the plurality of first 3D images to a first wireless access point by means of WIFI,
- the first wireless access point is configured to transmit the plurality of first 3D images to a core network by means of wired communication;
- the core network is configured to transmit the plurality of first 3D images to a second wireless access point by means of wired communication; and
- the second wireless access point is configured to transmit the plurality of first 3D images to the terminal device by means of wireless communication.

13. The electronic device of claim 9, wherein,
- the image acquisition component comprises a structured light projection module configured to obtain the plurality of depth maps; and/or
- the image acquisition component comprises a first camera and a second camera, the first camera is configured to obtain a plurality of first 2D images, the second camera is configured to obtain a plurality of second 2D images, the plurality of 2D images comprise the plurality of first 2D images and the plurality of first 2D images; and/or
- the image acquisition component comprises a Time of Flight (TOF) sensor module configured to obtain the plurality of depth maps.

14. The electronic device of claim 9, wherein the communication module is further configured to receive a plurality of second 3D images from the terminal device.

15. The electronic device of claim 14, further comprising:
a displayer, configured to display the plurality of second 3D images at a predetermined frame rate to display a corresponding 3D video.

16. The electronic device of claim 14, wherein the processor is configured to decompress the plurality of second 3D images.

17. A non-transitory computer-readable storage medium comprising one or more computer executable instructions thereon that when executed by one or more processors, cause the one or more processors to perform acts of:
- obtaining a plurality of two-dimensional (2D) images and/or a plurality of depth maps for a current scene, the plurality of 2D images and/or the plurality of depth maps being aligned in time;
- processing the plurality of 2D images and/or the plurality of depth maps to obtain a plurality of first three-dimensional (3D) images;
- compressing the plurality of first 3D images in a compression ratio, wherein the compression ratio can be adaptively adjusted according to different scenarios, the scenarios including a location of the electronic device and an application of the plurality of 3D images; and
- transmitting the plurality of compressed first 3D images to a terminal device by means of wireless communication.

* * * * *